United States Patent

Kusaki et al.

[11] Patent Number: 5,991,379
[45] Date of Patent: Nov. 23, 1999

[54] RADIO COMMUNICATION SYSTEM AUTHENTICATING A PERSONAL STATION AND CALCULATING A FEE OF A TELEPHONE CALL FROM THE PERSONAL STATION

[75] Inventors: Tsutomu Kusaki; Jun Yamada, both of Yokohama; Fumitaka Itoh, Inzai; Takeshi Mori, Yokohama, all of Japan

[73] Assignee: Hitachi, Ltd., Tokyo, Japan

[21] Appl. No.: 08/795,129

[22] Filed: Feb. 7, 1997

[30] Foreign Application Priority Data

Feb. 9, 1996 [JP] Japan ................................. 8-024026

[51] Int. Cl.[6] .............................................. H04M 15/00
[52] U.S. Cl. ......................... 379/115; 379/114; 379/112;
379/126; 379/91.01; 455/405; 455/406;
455/411
[58] Field of Search .................................. 379/111, 114,
379/115, 120, 121, 127, 112, 113, 91.01,
91.02, 93.02; 455/403, 405, 406, 407, 408,
409, 411, 410

[56] References Cited

U.S. PATENT DOCUMENTS

| | | | |
|---|---|---|---|
| 5,321,735 | 6/1994 | Breeden et al. | 379/112 |
| 5,329,573 | 7/1994 | Chang et al. | 455/411 |
| 5,425,083 | 6/1995 | Furuya et al. | 379/111 |
| 5,430,794 | 7/1995 | Ayame | 379/114 |
| 5,583,918 | 12/1996 | Nakaga | 379/114 |
| 5,625,869 | 4/1997 | Nagamatsu et al. | 379/59 |

FOREIGN PATENT DOCUMENTS 6-217365  8/1994  Japan .

*Primary Examiner*—Paul Loomis
*Assistant Examiner*—Rexford N. Barnie
*Attorney, Agent, or Firm*—Antonelli, Terry, Stout & Kraus, LLP

[57] ABSTRACT

According the present invention, a line using status of each personal station which contains an existing analog line in a route between the personal station and an exchange unit is determined. The PS number of a personal station having a telephone call, the line number used for the telephone call, and the line use order of in which the personal station uses the line are registered in a billing unit provided to a cell station every time a telephone call is made, and the line number, the line use order and the charging rate parameter of usage of the line are registered in a billing center every time a telephone call is made. Further, the information registered in the billing unit is periodically collected in the form of analog signals in the billing center, and the PS number and the charging rate parameter are associated with each other by using the line number and the line use order as a key.

10 Claims, 15 Drawing Sheets

FIG.10

| LINE NUMBER | LINE USE ORDER NUMBER | CHARGING RATE PARAMETER(FEE) |
|---|---|---|
| 4123 | 1 | 24 |
| | 2 | 65 |
| | 3 | 8 |
| | ⋮ | ⋮ |
| 5982 | 1 | 15 |
| | 2 | 3 |
| | 3 | 44 |
| | ⋮ | ⋮ |
| 3647 | 1 | 30 |
| | 2 | 20 |
| | 3 | 6 |
| | ⋮ | ⋮ |
| ⋮ | ⋮ | ⋮ |

| SUBSCRIBER NUMBER | LINE NUMBER | LINE USE ORDER NUMBER | CHARGING RATE PARAMETER(FEE) |
|---|---|---|---|
| 3786−9485 | 4123 | 2 | 65 |
| | 3647 | 13 | 6 |
| | 5189 | 6 | 1 |
| | ⋮ | ⋮ | ⋮ |
| 6486−3648 | 2397 | 9 | 45 |
| | 3176 | 18 | 3 |
| | 3647 | 68 | 6 |
| | ⋮ | ⋮ | ⋮ |
| 4683−3674 | 5189 | 56 | 8 |
| | 6378 | 72 | 1 |
| | 3482 | 33 | 40 |
| | ⋮ | ⋮ | ⋮ |
| ⋮ | ⋮ | ⋮ | ⋮ |

RADIO COMMUNICATION SYSTEM AUTHENTICATING A PERSONAL STATION AND CALCULATING A FEE OF A TELEPHONE CALL FROM THE PERSONAL STATION

BACKGROUND OF THE INVENTION

1. Field of the Invention

A communication system according to the present invention is established on the assumption that lines between an exchange unit 1200 and cell stations 200 and between the exchange unit 1200 and a concentrator 300 comprise existing subscriber lines (i.e., the exchange unit 1200 is connected to each of the cell station(s) 200 and the concentrator 300 through the subscriber lines), and the exchange unit 1200 is further connected through the cell stations 200 or the concentrator 300 to WLL (Wireless Local Loop) fixed terminals (e.g., personal stations: hereinafter referred to as "PS") whose number is larger than the number of subscriber lines (see FIG. 1). Therefore, the one-to-one corresponding relationship is not established between the subscriber lines and the WLL fixed PS serving as a subscriber PS, and thus correct billing cannot be performed on each WLL fixed PS in a conventional exchange unit system because the conventional exchange unit system has charged the fee for a telephone call merely on a subscriber line basis. Therefore, the present invention relates to a communication system using personal stations (PS), and particularly to a collecting technique for billing information in a communication system in which a communication route between a communication network and a concentrator or a cell station (CS) comprises an existing analog line.

2. Description of Related Art

A simple portable telephone system, known as a PHS (Personal Handy Phone System), has been practically used as a communication system using personal stations (PS). The PHS system basically comprises personal stations (PS), cell stations (CS) which are connected to the personal stations (PS) through wireless digital lines, a concentrator which is connected to plural cell stations (CS) through lines, and a network which is connected to the concentrator and the cell stations (CS) through lines.

The PHS system is established on the assumption that it uses a signal system based on ISDN (Integrated Services Digital Network) which is a kind of digital line. Like the ISDN, the signal system generally has a B-channel for transmitting information of a telephone call such as voice or the like and a D-channel for control information, and the B-channel and the D-channel are designed independently of each other. Therefore, according to the PHS, a control signal containing information required for authentication information and billing between a network and a cell station is transmitted and/or received through the D-channel of the signal system while telephone voice is transmitted and/or received through the B-channel, whereby the control signal and the telephone voice can be transmitted or received in parallel on the time axis (e.g., simultaneously).

The infrastructure located near to the subscriber personal station (hereinafter referred to as "subscriber PS") of a Public Switching Telecommunication Network (PSTN) needs the highest cost compared to the other portions, and also needs more time for laying. In view of this problem, in order to lay a low-cost and high-speed infrastructure, a wireless line used for portable telephone may be used as a wireless subscriber line for a part of an existing subscriber line which is near to a subscriber PS. With respect to the existing subscriber line, only one subscriber line is allocated to each subscriber. Therefore, if billing is performed on a line basis, the billing is also performed on a subscriber basis. Further, in this case, in consideration of minimizing alteration of the facilities of an existing exchange and suppressing the cost-increase, there may be a case where an existing analog subscriber line is used between a cell station (CS) and a network or between a concentrator and a network. However, there is the following characteristic of the wireless line as a wireless concentrating effect:

(the number of subscribers belonging to a cell station)>(the number of wireless lines)

As described above, the one-to-one corresponding relationship is not established between the line and the subscriber. Therefore, when the billing is made to each subscriber at the exchange unit side, it is required for every call that discrimination information on a calling side, for example, a PS number (subscriber number) is notified to the exchange unit.

In the case of the ISDN, the notification of the PS number can be performed on a real-time basis because a signal line and a telephone path are separately provided. Therefore, the billing can be performed in an exchange unit as disclosed in Japanese Laid-open Patent Application No. Hei-6-217365 or a data base connected to the exchange unit. However, when a line accommodated in an exchange unit is an existing analog line as described above, a tone signal may be used to notify a subscriber number (PS number). However, in this method, a connection delay occurs at the time of calling, and there may occur a case where a line connection cannot be established due to time-out of a connection standby timer in accordance with the regulations of a network or an exchange unit to be connected.

Further, PS (personal station) authentication processing which is one characteristic processing when a wireless line connection is carried out, and is performed between a PS and an exchange unit or a network, also requires signal transmission/reception for every call on a real-time basis at the time of line connection, however, this requirement cannot be satisfied for the reason described above.

SUMMARY OF THE INVENTION

Therefore, an object of the present invention is to provide a communication system using personal stations (PS) in which correct billing to a subscriber or authentication of a subscriber PS can be performed even when an existing analog subscriber line is used between a cell station (CS) and a network or between a concentrator and a network.

According to the present invention, in order to perform correct billing to a subscriber even when an analog subscriber line is used, a communication system according to the present invention comprises an exchange unit for calculating the fee of a telephone call for every line which has been already set, a cell station which is connected through the line to the exchange unit, and plural personal stations which are connected to the cell station through wireless lines, wherein the number of the lines is smaller than the number of the personal stations, the cell station is provided with storing means for storing PS use information of a personal station which uses the line and a line-using time every time the personal station which is accommodated in the cell station telephones through the cell station and the line, the exchange unit is provided with storing means for storing a line using time and a telephone call fee as line use information every time a line connected to the exchange unit is used, a billing system connected to the exchange unit is provided with calculation means for calculating the telephone call fee for a personal station in which the line use times contained in the PS use information and the number of line use information items are coincident with each other. Accordingly, even when plural personal stations are accommodated under existing exchange units and lines such that no numerical corresponding relationship is established therebetween, correct billing of each personal station can be performed. More specifically, a communication system contains plural personal stations (PS), cell stations (CS) each for accommodating personal stations through wireless lines, a subscriber line exchange network for accommodating the cell stations through plural analog subscriber lines, and a billing system device connected to the subscriber line exchange network, wherein each of the cell stations is provided with means for generating and recording billing information for the PS which comprises PS discrimination information for specifying a personal station (PS) having a telephone call, line discrimination information for specifying an analog subscriber line used for the telephone call and line use order information (call number information on the line) for specifying the order of usage of the analog subscriber line, for every telephone call which is made through the cell station with the subscriber line exchange network by a personal station accommodated in the cell station and for which the personal station is billed; and means for transmitting the recorded billing information for the PS through the subscriber line exchange network to the billing system device in response to a transmission request which is received from the billing system device through the subscriber line exchange network, and the billing system device is provided with means for generating and recording billing information for the line which comprises line discrimination information for specifying an analog subscriber line used for the telephone call, line use order information (call number information on the line) for specifying the order of usage of the analog subscriber line, and charging rate parameter information for specifying the charging rate parameter representing the degree of usage of the subscriber line exchange network in the telephone call, for every telephone call which is made through the cell station with the subscriber line exchange network by a personal station accommodated in the cell station and for which the personal station is billed; means for transmitting the transmission request through the subscriber line exchange network to the cell station to collect the billing information for a PS which is transmitted from the cell station; and means for collating the collected billing information for the PS and the recorded billing information for the line with each other to generate PS discrimination information contained in the billing information for the PS when a pair of the line discrimination information and the line use order information are coincident between the collected billing information for the PS and the recorded billing information for the line, and billing information for the subscriber which is associated with call charging rate parameter information contained in the billing information for the line for the telephone call which is made by the personal station specified by the PS discrimination information and for which the personal station is billed.

Further, in order to accurately perform authentication of a personal station on a real-time basis even when an analog subscriber line is used, a communication system includes plural personal stations, a subscriber line exchange network for exchanging a call of a personal station to an analog subscriber line, a relay device which is connected to the subscriber line exchange network through the analog subscriber line and relays call between the analog subscriber line and the personal station, and an operation center device which is connected to the subscriber line exchange network, wherein the relay device is provided with means for storing the PS number of at least one personal station which is received from the operation center device through the subscriber line exchange network, and authentication information which is associated with the PS number, and means for performing the authentication of a personal station by using the authentication information associated with the stored PS number of the personal station when the personal station makes a telephone call using the subscriber line exchange network through the relay device.

According to the communication system as described above, accurate authentication and billing processing can be performed without transmitting/receiving the authentication information and the billing information on a real-time basis to a call of a personal station between the cell station or concentrator and the network, and further without altering a signal system for existing analog subscriber lines.

BRIEF DESCRIPTION OF THE DRAWINGS

FIG. 10 is a diagram showing the content of a line billing information data base;

DETAILED DESCRIPTION OF PREFERRED EMBODIMENT

A preferred embodiment according to the present invention will be described hereunder with reference to the accompanying drawings.

Figure 1:
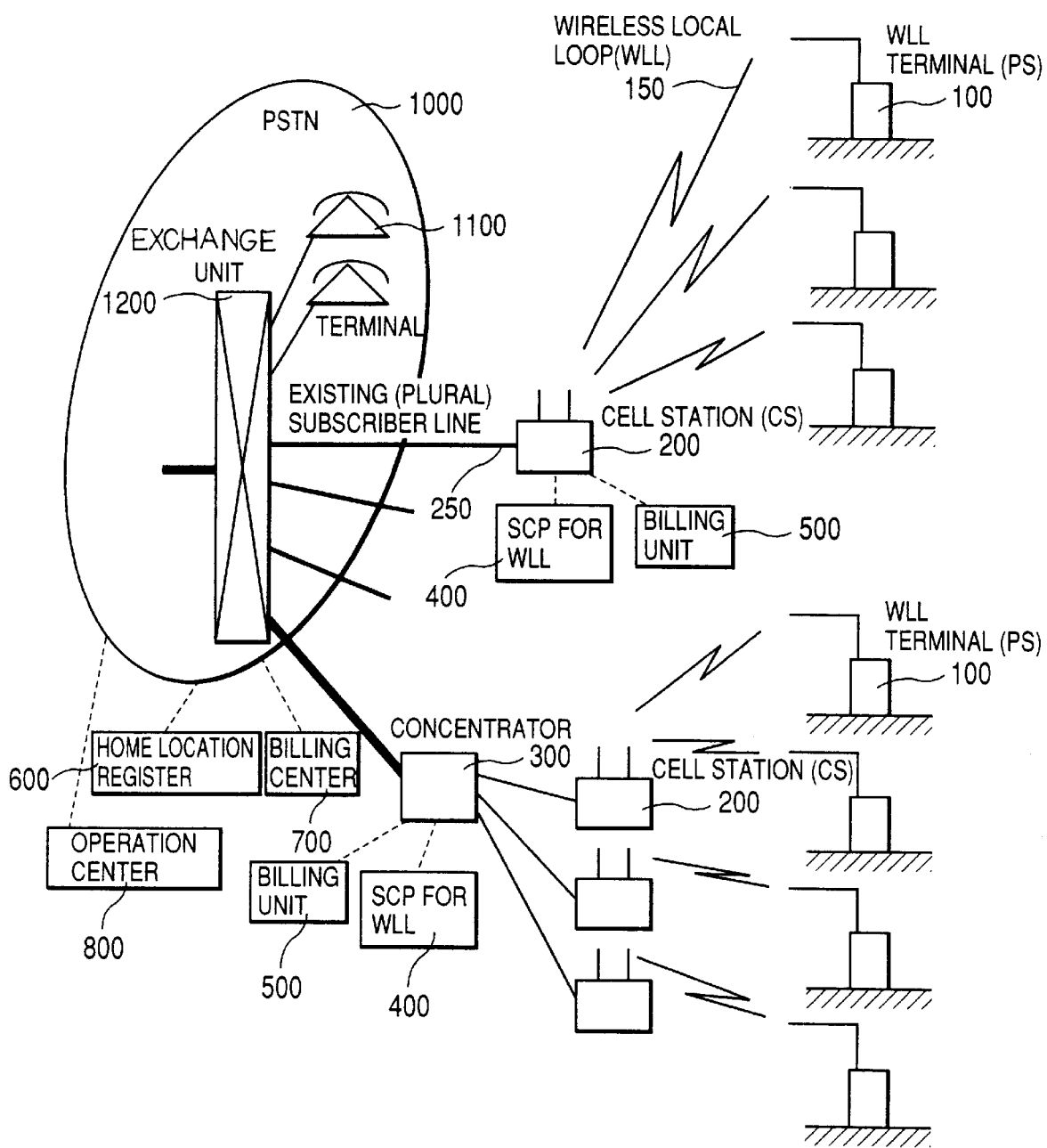
FIG. 1 is a block diagram showing the construction of a communication system.

FIG. 1 shows the construction of a communication system according to an embodiment of the present invention.

As shown in FIG. 1, the communication system according to this embodiment includes plural PSs 100 for a digital wireless local loop (hereinafter referred to as "WLL"), plural cell stations (CS) 200 each of which is adapted to accommodate PSs 100 through a WLL, concentrators 300 each of which is adapted to accommodate plural cell stations (CS) 200 through digital lines, a WLL service control point (SCP) 400 and a billing unit 500 which are connected to or accommodated in a cell station 200 or a concentrator 300, and a home location register (HLR), in other words a location information data base, 600, a billing center (billing system) 700 and an operation center (OPC) which are connected to an existing public switching telecommunication network (PSTN) 1000.

The lines between an exchange unit 1200 and each cell station 200 and between the exchange unit 1200 and each concentrator 300 comprise existing subscriber lines.

Further, according to the present invention, the number of PSs for WLL is set to be larger than the number of subscriber lines. Therefore, the present invention is based on the assumption that a one-to-one corresponding relationship is not established between the subscriber lines and the WLL fixed PSs which are subscriber PSs. Under the system construction as described above, when a call is made or received by a WLL fixed PS, a vacant subscriber line is selected and allocated to the WLL fixed PS every time so as to carry out communication. More specifically, there may be such a situation that a line A (for example, a line number "4123" in FIG. 10) is used for a first communication, and a line B (a line number "5982" in FIG. 10) is used for a second communication. That is, the communication system of the present invention is designed so that a smaller number of subscriber lines are commonly used by plural subscribers. Further, the existing exchange unit 1200 is of such a type as to carry out billing on a line basis.

The normal (correct) billing can be performed by adding the following elements to the above structure. That is, a SCP (service control point) 400 which is disposed in a cell station 200 or a concentrator 300, a billing unit 500, a billing center 700 which is disposed at a network side such as PSTN or the like, the home location register 600, an operation center 800, etc. are provided, and authentication information and billing information are delivered among these elements, whereby normal billing can be performed. As shown in FIG. 1, the cell station 200 which is connected to the concentrator 300 having the SCP 400 and the billing unit 500 is not provided with the SCP 400 and the billing unit 500. On the other hand, the cell station 200 which is not connected to the concentrator 300 having the SCP 400 and the billing unit 500 is provided with the SCP 400 and the billing unit 500.

A PSTN 1000 is designed to contain one or plural exchange units. FIG. 1 shows a communication system according to the embodiment of the present invention in which the PSTN 1000 is illustrated as being represented by an exchange unit 1200. The cell station (CS) 200 or the concentrator 300 which is provided with the SCP 400 and the billing unit 500 is connected to the exchange unit 1200 in the PSTN 1000 through an analog wire line. Here, the exchange unit records, for every call, a line number being currently used, a line use number representing the number (order) of a current telephone call through the line concerned, and a charging rate parameter (the fee of a telephone cal) through the line concerned. Alternately, when the exchange unit does not record these data, it notifies these data to the billing center 700 after the call is finished.

In the construction shown in FIG. 1, the communication between a PS for WLL 100 and another WLL PS and between the PS for WLL 100 and a PS 1100 connected to the PSTN 1000 is performed through a WLL 150, a cell station (CS) 200 (or a cell station (CS) 200 and a concentrator 300), and the PSTN 1000. In this embodiment, as described later in more detail, the SCP for WLL 400 performs PS authentication processing of the PS for WLL 100, the billing unit 500 and the billing center 700 performs collection and totalization of billing information of subscribers in cooperation with each other, the HLR 600 holds the location information of the PS for WLL which is used in a calling routine operation, and the OPC 800 performs various control operations on registration of subscriber information when a subscriber moves.

Next, the cell station (CS) 200 according to this embodiment will be described.

Figure 2:
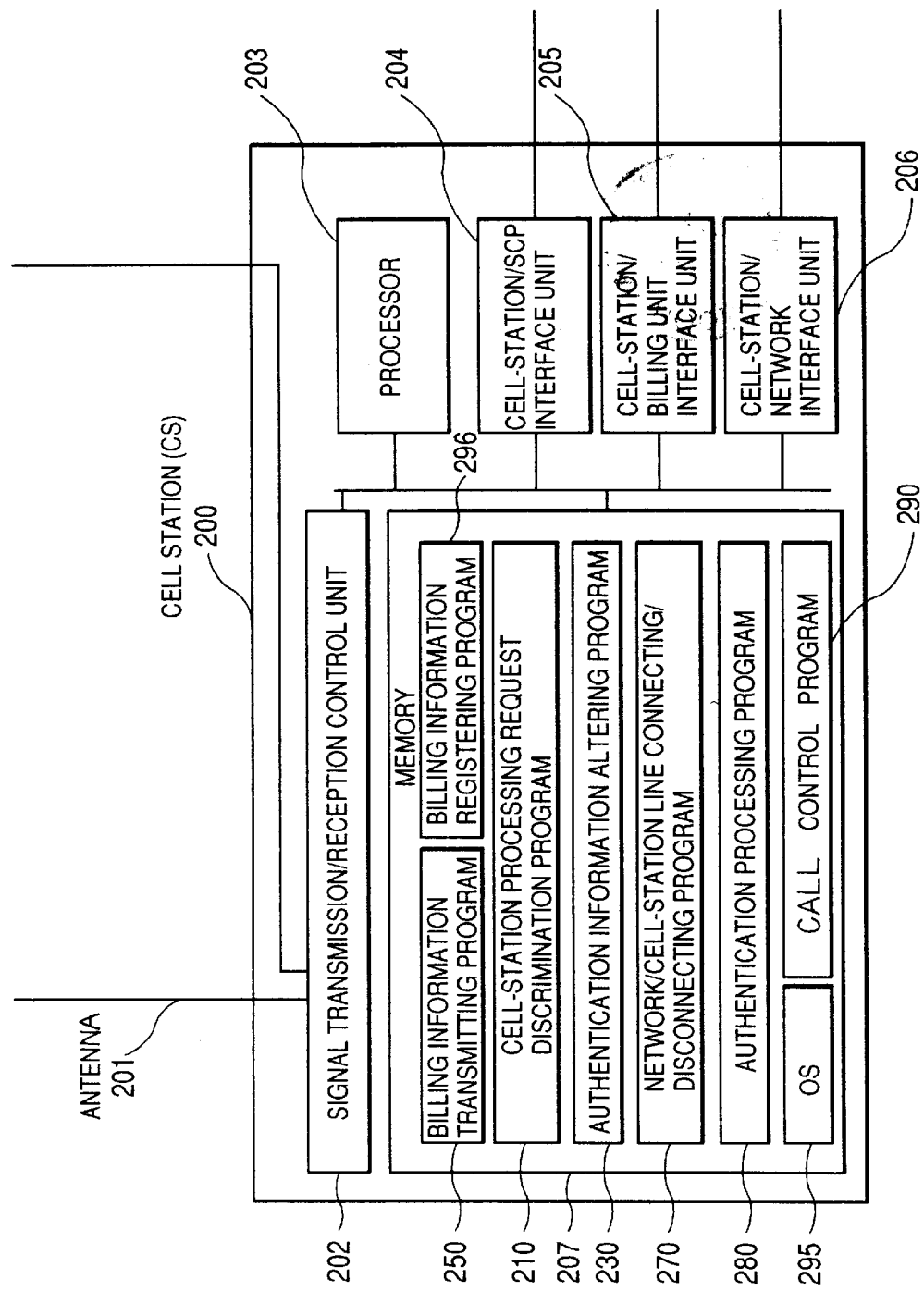
FIG. 2 is a block diagram showing the construction of a cell station (CS)

FIG. 2 shows the construction of the cell station (CS) 200 which is connected to the SCP 400 and the billing unit 500.

As shown in FIG. 2, the cell station (CS) 200 according to this embodiment includes an antenna 201, a signal transmission/reception control unit 202 for controlling transmission/reception signal with the PS for WLL 100 through the antenna 201, a cell-station/SCP interface unit 204 for connecting the cell station 200 and the SCP 400, a cell-station/billing unit interface unit 205 for connecting the cell station 200 and the billing unit 500, a cell-station/network interface unit 206 for connecting the cell station 200 and the concentrator 300 or the exchange unit 1200, a memory 207 for storing various programs such as OS (Operating System), calling control processing, etc., and a processor 203 for starting and executing these programs.

In the memory 207, a cell-station processing request discriminating program 210 for detecting and discriminating a processing request from the network side to the cell station, an authentication information altering program 230 for instructing deletion and registration of authentication information for the SCP 400 in response to a request from the network side, a billing information transmitting program 250 for requesting PS billing information to the billing unit 500 in response to a request from the network side, a network/cell-station line connecting/disconnecting program 270 for controlling connection/disconnection of a call between the network side and the cell station (CS), an authentication processing program 280 for performing PS authentication processing in cooperation with the SCP 400, a call control program 290 for controlling a call of a personal station (PS) 100, a billing information registering program 296 for requesting registration of PS billing information to the billing unit 500, and an OS 295 which is an operating system to use the above programs, are all stored.

Figure 3:
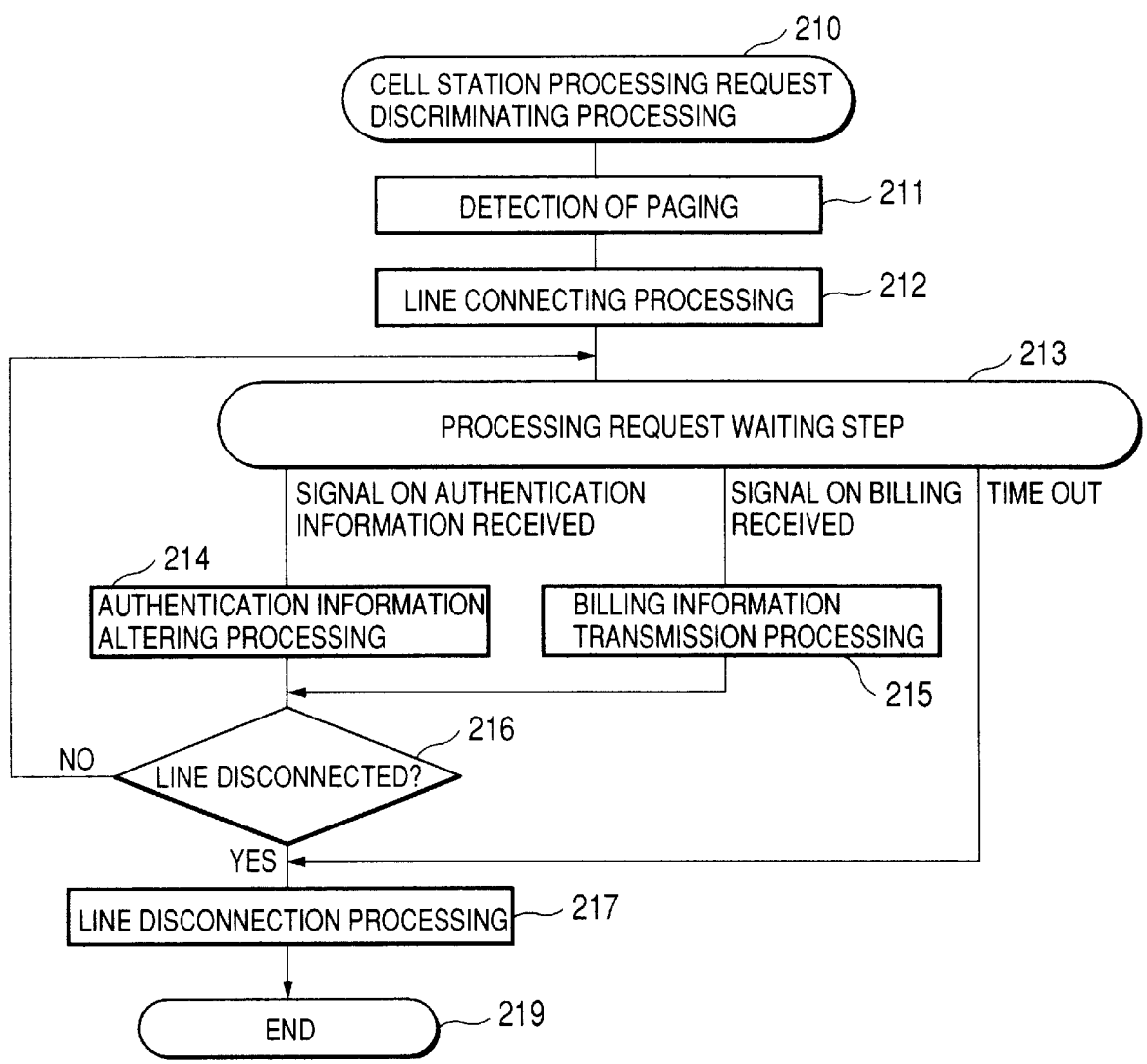
FIG. 3 is a flowchart showing a cell station (CS) processing request discriminating program.

As shown in FIG. 3, the cell station (CS) processing request discriminating program 210 is started in response to the paging from a network side to a cell station (CS) (211). Subsequently, the processor 203 of the cell station (CS) 200 performs the following operation according to the cell station (CS) processing request discriminating program 210.

First, in response to the paging, the processor 203 executes the line connection processing between the network side and the cell station (CS) 200 (212), and after the line connection is completed, it is shifted to a processing request (message) waiting state (213). When receiving an authentication information registering or deleting request from the operation center 800, the processor 203 executes the authentication information altering processing (214). When receiving a billing information transmitting request from the billing center 700, the processor 203 executes the billing information transmission processing (215). Thereafter, if a line disconnection request is made from the network side, the processor 203 executes the line disconnection processing (217) to finish this processing. If no line disconnection request is made, the processor 203 returns to the processing request waiting step 213.

In processing request waiting step 213, if the processor 203 has received no processing request for a fixed time, it executes the line disconnection processing (217), and finishes this processing. Here, the authentication information deleting request from the operation center 800 contains an identification number of a PS to which the deletion is requested. Further, the authentication information registering request from the operation center 800 contains a PS number (an identification number of a PS to which the registration is requested) and authentication data for authenticating the PS concerned.

A signal is communicated (transmitted and received) on an analog wire line between the cell station (CS) and the network in the form of a predetermined analog modulation signal.

Here, the line connection processing (212) and the line disconnection processing (217) serve to start the cell-station/network line connecting/disconnecting program 270 for connecting and disconnecting the line between the cell station and the network, the authentication information altering processing (214) serves to start the authentication information altering program 230, and the billing information transmitting processing (215) serves to start the billing information transmitting program 250.

When the authentication information altering program 230 is started by the authentication information altering processing (214), the processor 203 of the cell station (CS) 200 performs the following operation according to the authentication information altering program 230.

Figure 4:
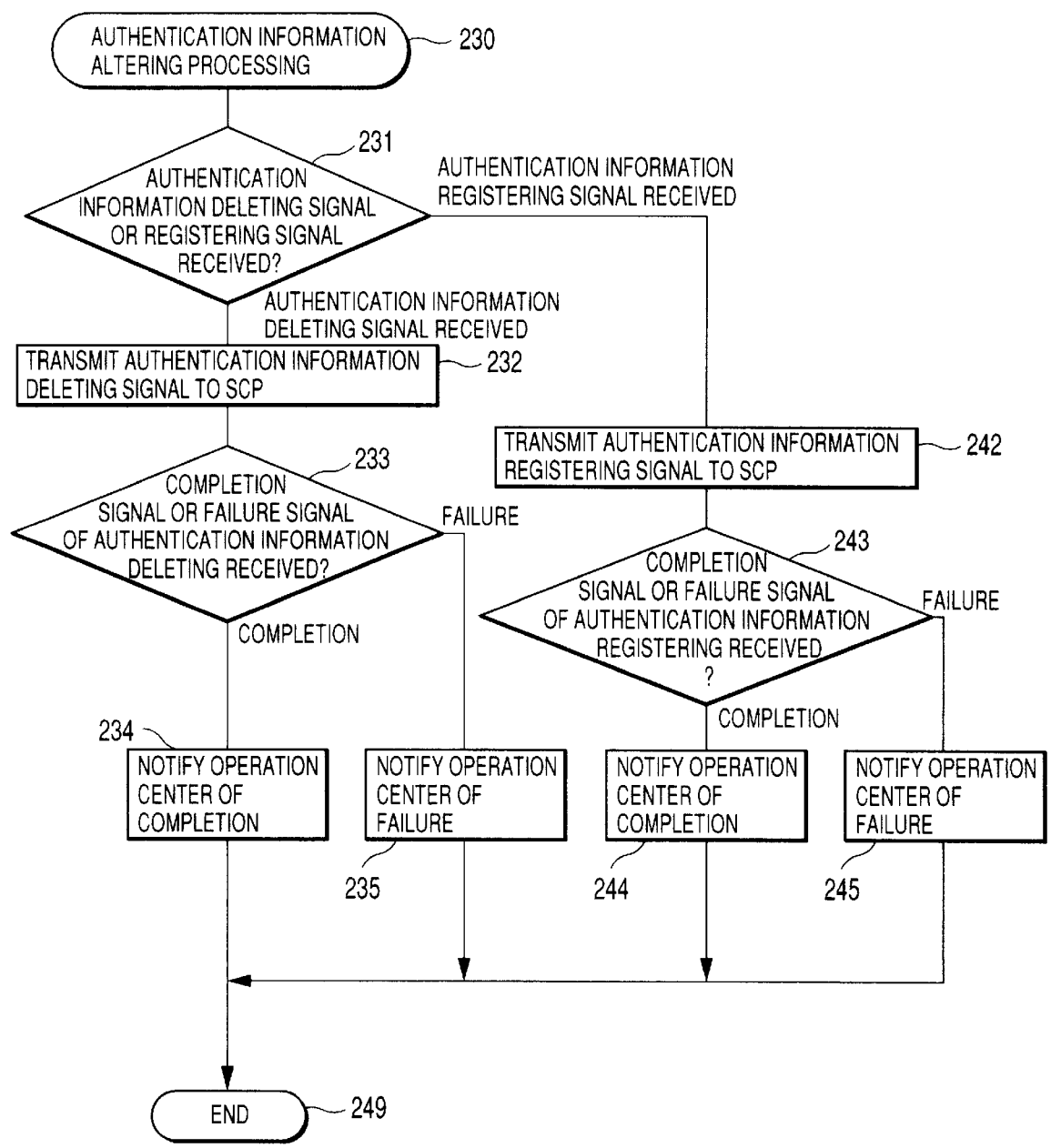
FIG. 4 is a flowchart showing an authentication information altering processing program.

First, as shown in FIG. 4, the processor 203 discriminates whether the processing request received from the operation center 800 is the authentication information deleting request or the authentication information registering request (231). If it is discriminated as the authentication information deleting request, the processor 203 transmits an authentication information deleting signal for instructing the deletion of the authentication information to the SCP 400 along with the PS number which is received together with the authentication information deleting request from the operation center 800 (232), and waits for a signal representing completion or failure of the deletion of the authentication information from the SCP 400 (233). If the processor receives the signal representing the completion of the authentication information deletion, the processor notifies the completion of the authentication information deletion to operation center 800, and if the processor receives the signal representing the failure of the authentication information deletion, the processor notifies the failure of the authentication information deletion to the operation center 800 (234, 235), and then the processor finishes this processing (249).

On the other hand, if the request is the authentication information registering request, the processor transmits to the SCP 400 an authentication information registering signal for instructing the registration of the authentication information along with the PS number and the authentication data which are received from the operation center 800 together with the authentication information registering request (242), and waits for a signal representing completion or failure of the deletion of the authentication information from the SCP (243). If receiving the signal representing the authentication information registration completion, the processor notifies the completion of the authentication information registration to the operation center 800, and if receiving the signal representing the authentication information registration failure, the processor notifies the failure of the authentication information registration to the operation center 800 (244, 245), and then finishes this processing (249).

When the billing information transmitting program 250 is started by the billing information transmission processing (215), the processor 203 of the cell station (CS) performs the following operation according to the billing information transmitting program 250.

Figure 5:
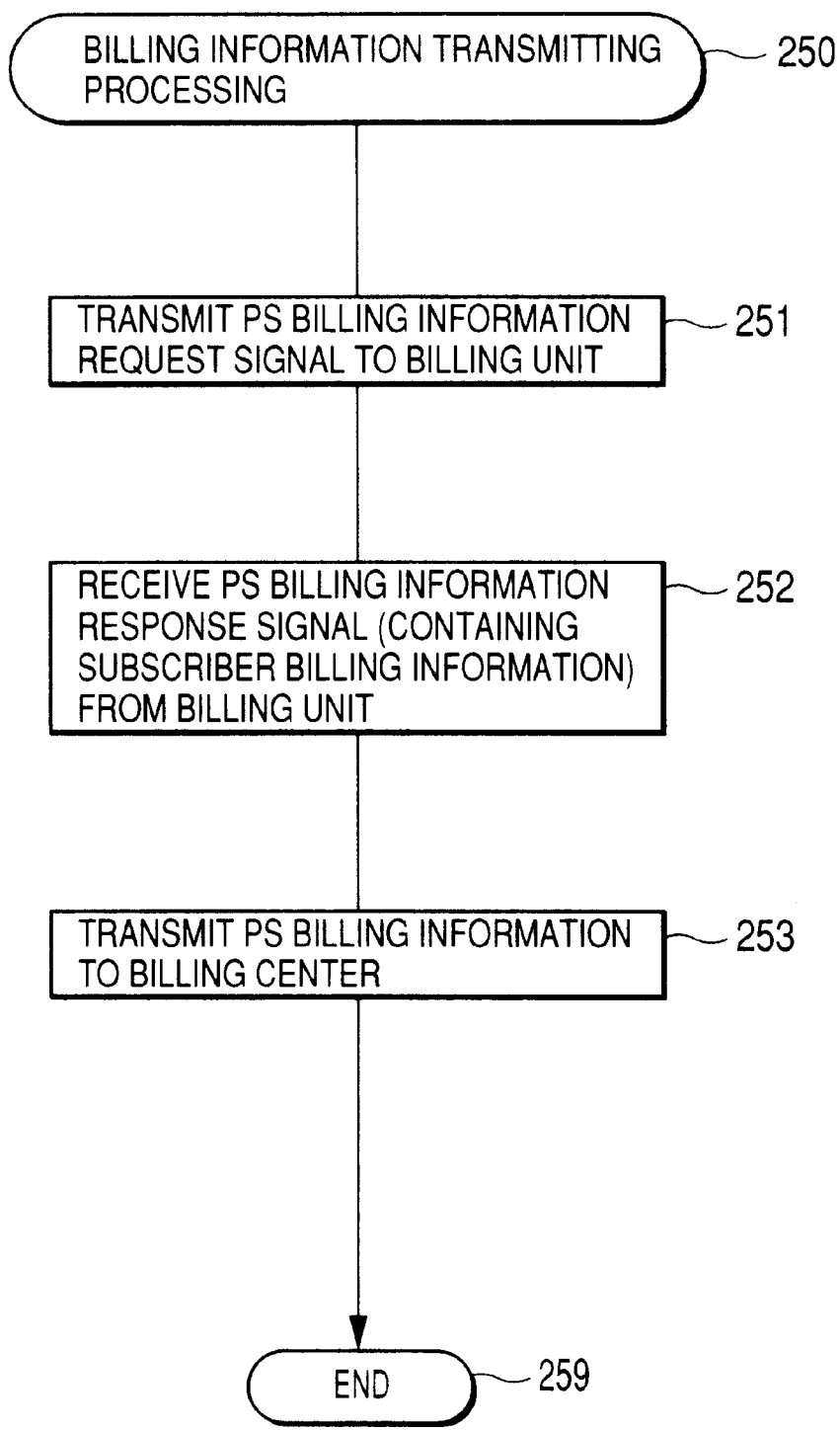
FIG. 5 is a flowchart showing a billing information transmission processing program.

That is, as shown in FIG. 5, the processor first transmits the billing information request signal to the billing unit 500 (251), and then shifts to a waiting state to wait for a response from the billing unit. When receiving the PS billing information from the billing unit (252), the processor transmits to the billing center 700 of the network side a subscriber information response signal containing the PS billing information from the billing unit (253), and then finishes this processing (259).

Further, the call control program 290 is started on the basis of a call from a PS 100 or paging from a network to a PS, and the processor 203 performs the processing of connecting a WLL between the cell station (CS) and a PS 100 to a wire line at the network side. The call control program starts the authentication processing program 280 to perform the authentication processing when a call is made from the PS 100, and also performs the billing information registration processing to start the billing information registering program 296 when the call is established to bill a PS accommodated in the cell station (CS) 200.

In the authentication processing, the authentication processing program requests the authentication data request signal together with the PS number of a calling PS or the PS number of a paged PS which is contained in a call setting request of the PS to the SCP 400. By using the authentication data received from the SCP 400, the authentication processing is performed between the cell station (CS) and the calling PS or the paged PS which is connected through the WLL to the cell station. If the SCP 400 notifies that the authentication number of the PS having the PS number concerned is not registered, the call is interrupted.

In the billing information registering processing, in the case where a calling side billing system is adopted, the billing information registering signal is transmitted to the billing unit 500 together with the PS number of the calling PS concerned and the line number of a line of the network side which is being used for the call when a call is established between the calling PS connected through the WLL to the cell station 200 and another PS (paged PS) which is called by the calling PS. On the other hand, in the case where a called side billing system is adopted, the billing information registering signal is transmitted to the billing unit 500 together with the PS number of the called PS and the line number of a line of the network side which is being used for the call when a call is established between the called PS connected through the WLL to the cell station (CS) 200 and the calling PS.

The foregoing description is made on the cell station (CS) 200 having the SCP 400 and the billing unit 500.

In the case of a cell station having no SCP 400 and billing unit 500, the cell-station/SCP interface unit 204, the cell-station/billing unit interface unit 205, the authentication information altering program 230, the billing information transmitting program 250, the billing information registering program 296 and the authentication processing program 280 may be omitted from the construction shown in FIG. 2. Further, the call control program 290 performs neither the billing information registering processing nor the authentication processing.

Next, the SCP 400 will be described. In the following description, the SCP 400 which is connected to the cell station 200 will be representatively described in detail.

Figure 6:
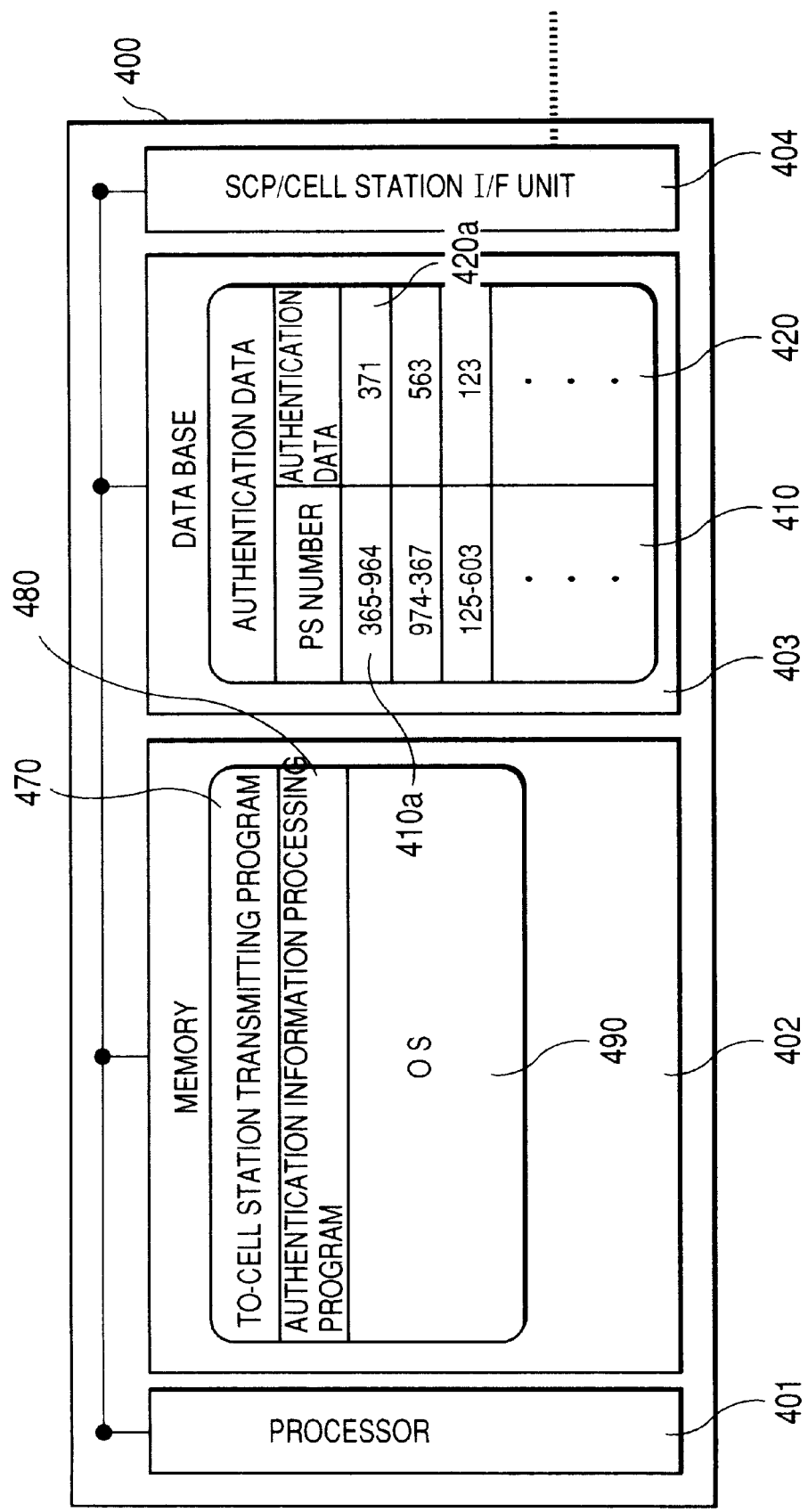
FIG. 6 is a block diagram showing the construction of SCP.

FIG. 6 shows the construction of the SCP 400.

As shown in FIG. 6, the SCP 400 comprises a processor 401, a memory 402 for storing various programs, a data base 403 for holding authentication information which is used for the authentication processing of subscriber PSs, and an SCP/cell-station I/F unit 404.

In the memory 402 a to-cell-station transmission/reception program 470 for controlling the transmission/reception of a signal to/from a cell station (CS), an authentication information processing program 480 for performing the deletion and registration of the authentication information in the data base 403 and the transmission of the authentication information to the cell station (CS) in accordance with an instruction from the cell station (CS), and an OS 490 are stored.

Further, in the data base 403 are stored entries of plural PSs, each entry comprising a pair of a PS number 410 (410a-) and authentication data 420 (420a-) of the PS corresponding to the PS number.

In the construction as described above, when receiving an authentication information deleting signal from the cell station (CS) 200, the processor 401 of the SCP 400 starts the authentication information program 480 to search from the data base 403 the entry containing the PS number which is transmitted together with the authentication information signal and delete the searched entry from the data base 403. Further, upon receiving the authentication information registering signal from the cell station (CS) 200, the processor 401 of the SCP 400 starts the authentication information processing program 480 to register the entry containing the PS number and the authentication data which are transmitted together with the authentication information registering signal in the data base 403. If the entry containing the PS number 410 to be registered has already existed on the data base 403, only the authentication data 420 of the entry concerned are renewed to the authentication data which are received together with the authentication information registering signal.

Further, when receiving an authentication data request signal from the cell station (CS), the processor 401 of the SCP 400 starts the authentication information processing program 480 to search the data base 403 for the entry containing the PS number which is received together with the authentication data request signal. If the entry has existed on the data base 403, the authentication data of the searched entry are transmitted to the cell station 200. If not, the non-existence of the entry is notified to the cell station 200.

The foregoing description relates to the SCP 400 connected to the cell station 200, and the SCP 400 connected to the concentrator 300 differs from the SCP 400 connected to the cell station 200 only in that the SCP 400 transmits/receives various information and signals to/from the concentrator 300 in place of the cell station 200.

Next, the billing unit 500 will be described. In the following description, the billing unit connected to the cell station 200 will be representatively described in detail.

Figure 7:
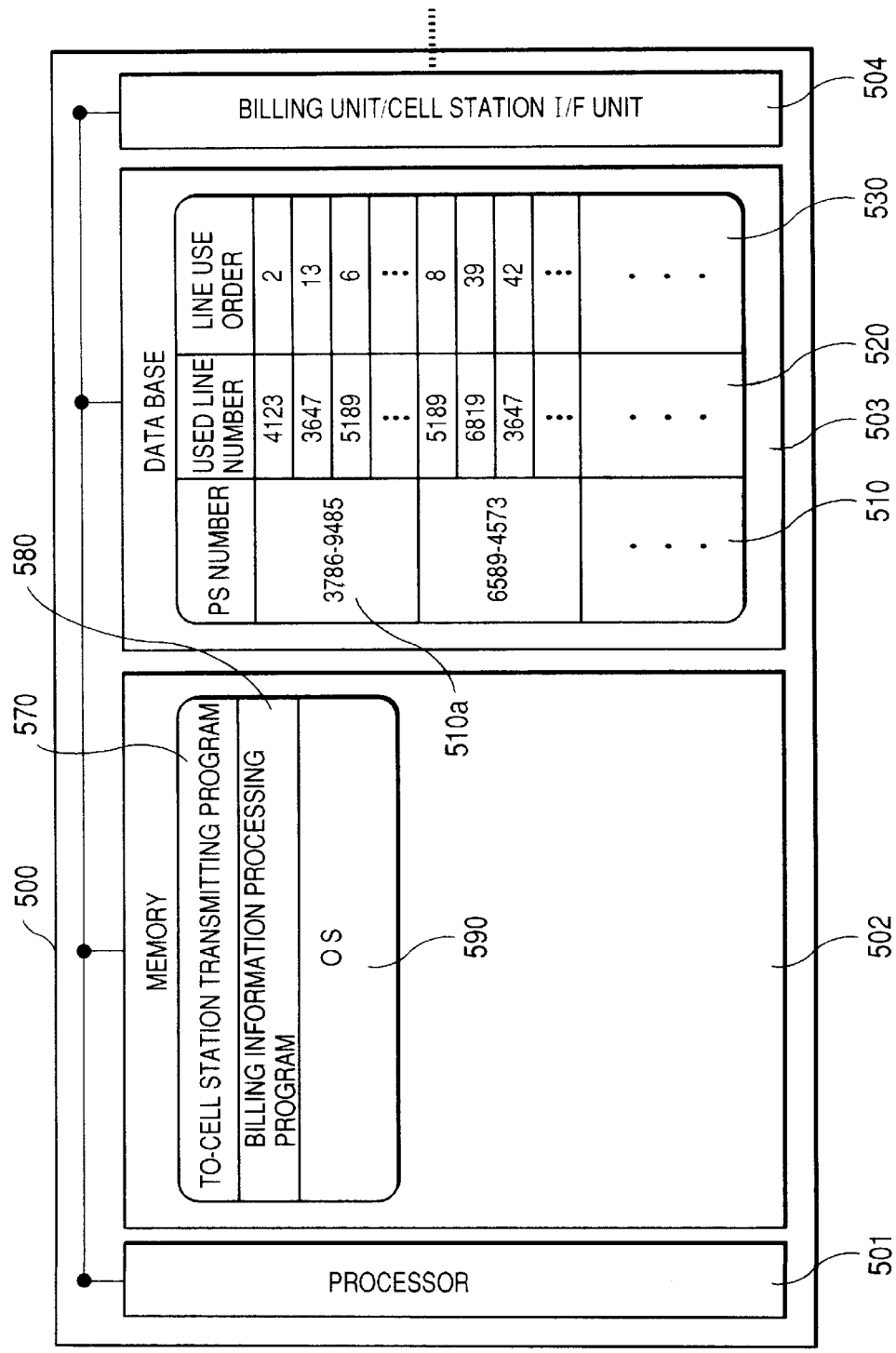
FIG. 7 is a block diagram showing the construction of a billing unit.

FIG. 7 shows the construction of the billing unit 500.

The billing unit 500 comprises a processor 501, a memory 502 for storing various programs, a data base 503 for holding telephoning information of the subscriber PS 100, and a billing unit/cell station I/F unit 504.

In the memory 502 are stored a to-cell-station transmitting program 570 for controlling a signal with the cell station (CS), a billing information processing program 580 for writing the PS billing information into the data base 503 in response to a billing information registering request signal from the cell station 200, reading out the PS billing information from the data base 503 in response to a billing information request signal from the cell station 200, and an OS 590.

For each telephoning operation by each PS (510a-), a line number 520 which is used from the cell station 200 to the exchange unit 1200 by the PS concerned and the line use order representing the order of use of the line by the PS are stored as PS billing information for every PS number 510 (from 510a) in the data base 503. The PS number 510, the line number 520 and the line use order 530 are stored in the data base 503 for the following reason. As described above, the one-to-one corresponding relationship is not established between the line and the subscriber, and it is weighted to dynamically determine which subscriber should be allocated to which line on a case by case basis. That is, as described later, the above three pieces of information and the billing information at the network side which holds the charging rate parameter of each line are collated with each other to finally perform the billing of each WLL subscriber. Further, as not shown, for each line of the network side which is accommodated in the cell station, the use frequency of the line until now is stored as line use information.

When receiving the billing information registering signal, the PS number and the line number, the processor 501 of the billing unit 500 responds to the cell station to allow reception, starts the billing information processing 580, refers to the line use information of the data base 503 to obtain the use frequency of the line of the line number concerned until now according to the program, and then updates the use frequency by adding "1" to the use frequency thus obtained. Further, the processor 501 updates the use frequency of each line concerned until now in the data base (not shown) which holds the line number concerned and the use frequency of the line concerned. Further, the processor registers a pair of the received line number and the updated use frequency into the data base 503. The renewed use frequency corresponds to the line use order 530.

Upon receiving the billing information request signal, the processor 501 of the billing unit 500 starts the billing information processing program 580 to read out the total PS billing information in the data base 503 according to the program and transmit the total PS billing information to the cell station. If the transmission is completed, the processor 501 deletes the PS billing information from the data base 503. In this case, if the storage capacity permits, the PS billing information may be left stored without being deleted, and a flag for the end of the transmission may be set.

The foregoing description relates to the billing unit 500 connected to the cell station 200. The billing unit 500 connected to the concentrator 300 differs from the billing unit 500 connected to the cell station 200 only in that the billing unit 500 transmits/receives various information and signals to/from the concentrator 300.

Figure 8:
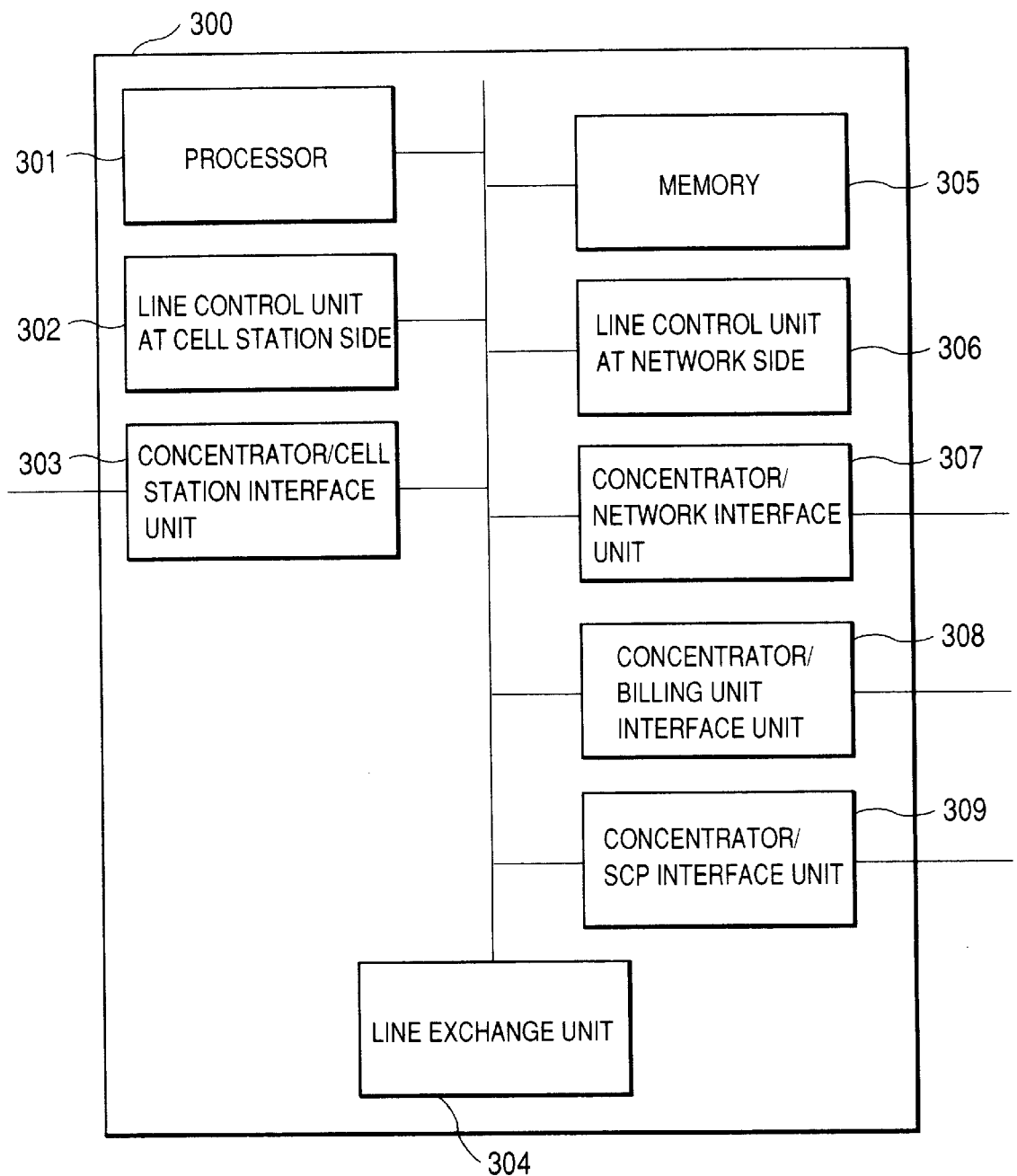
FIG. 8 is a block diagram showing the construction of a concentrator.

The construction of the concentrator 300 connected to the SCP 400 and the billing unit 500 is shown in FIG. 8.

As shown in FIG. 8, the concentrator 300 comprises a concentrator/SCP interface unit 309 for connecting the concentrator 300 to the SCP 400, a concentrator/billing unit interface unit 308 for connecting the concentrator 300 to the billing unit 500, a concentrator/network interface unit 307 for connecting the concentrator 300 to the exchange unit 1200, a line control unit 306 for controlling the line at the network side, a line control unit 302 for controlling the line at the cell station side, a line exchange unit 304 for performing a line exchange between the lines at the network side and the cell station side, a memory 305 for storing various programs which are executed by a processor 301, and the processor 301 for starting and performing these programs.

In the memory 305, a concentrator processing request discriminating program for detecting and discriminating a processing request which is made from the network side to the concentrator 300, an authentication information altering program for instructing the deletion and registration of the authentication information to the SCP 400 in response to a request from the network side, a billing information transmitting program for requesting PS billing information to the billing unit 500 in response to the request from the network side, a network/concentrator line connecting/disconnecting program for controlling the connection/disconnection of a call between the network side and the concentrator 300, an authentication processing program for performing the PS authentication processing in cooperation with the SCP 400, a call control program for controlling the call of a personal station (PS) 100 through the cell station 200, billing information registering processing program for requesting registration of the PS billing information to the billing unit 500, and an operating system OS to use these programs, are all stored. Here, the storage device may be designed in a single body, or a storage device for storing programs and a storage device for working may be separately provided.

The concentrator processing request discriminating program, the authentication information altering program, the network/concentrator line connecting/disconnecting program, the authentication processing program, the billing information registering program and the OS of the concentrator 300 correspond to the cell station processing request discriminating program 210, the authentication information altering program 230, the billing information transmitting program 250, the network/cell station line connecting/disconnecting program 270, the authentication processing program 280, the billing information registering program 296 and the OS 295 of the cell station 200 respectively, and these programs are used to perform the same processing as executed by the corresponding programs in the concentrator 300.

The call control program of the concentrator 300 controls the call between the line at the network side and each line at the cell station side, and this control contains a line exchange control in the line exchange unit 304.

Next, the billing center 700 will be described.

Figure 9:
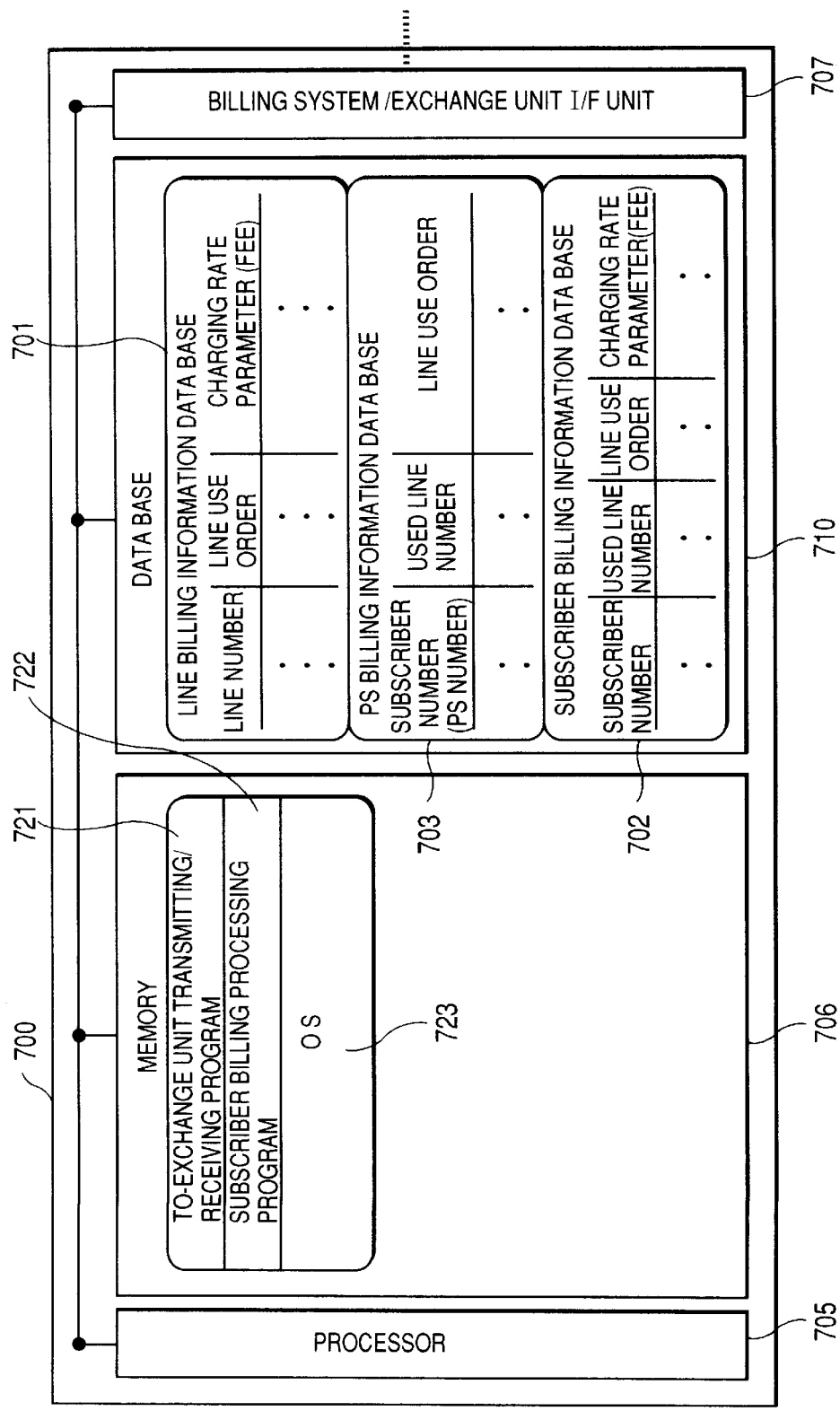
FIG. 9 is a block diagram showing the construction of a billing system (billing center)

FIG. 9 shows the construction of the billing center 700.

As shown in FIG. 9, the billing center 700 comprises a billing center/exchange interface unit 707 for connecting the billing center to the exchange unit 1200 which constitutes the network 1000, a data base 710, a memory 706 for storing various programs, and a processor 705.

In the memory 706 a to-exchange unit transmitting and receiving program 721 for controlling the transmission/reception of information with the exchange unit 1200, a subscriber billing processing program 722, an OS 723, etc. are stored.

The processor 705 performs the following operation according to each program stored in the memory 706.

A line billing information data base 701 is stored in the data base 710 of the billing center 700 through the processing of the processor 722 according to the subscriber billing processing program 722. Here, a charging rate parameter (the fee of a telephone call is separately calculated on the basis of the usage frequency) or the fee data of a telephone call at each subscriber-line using time is written in the line billing information data base 701 on the basis of a notification from the exchange unit 1200 for each subscriber line which is managed by the billing center 700. In short, the line billing information data base is a data base in which the usage fee of each line is stored. If the subscriber and line establishes the one-to-one corresponding relationship like the prior art, the billing can be performed with only this data base. However, in the case of introducing telephone facilities at low cost by providing cell stations or cell stations with a concentrator at the subsequent stage of an existing subscriber line as described above for which the billing is carried out on a line basis, the billing cannot be performed on a WLL PS basis unless the following equipment is added. Further, a PS billing information data base 703 in which PS billing information collected from each billing unit 500 is written is stored in the data base 710 through the processing of the processor 705 according to the subscriber billing processing program 722. Still further, a subscriber billing information data base 702 in which the use line and the charging rate parameter of each subscriber are prepared for every subscriber on the basis of the content of the line billing information data base 701 and the PS billing information data base 703 is stored on the data base 710 through the processing of the processor 705 according to the subscriber billing processing program 722.

Figure 10:
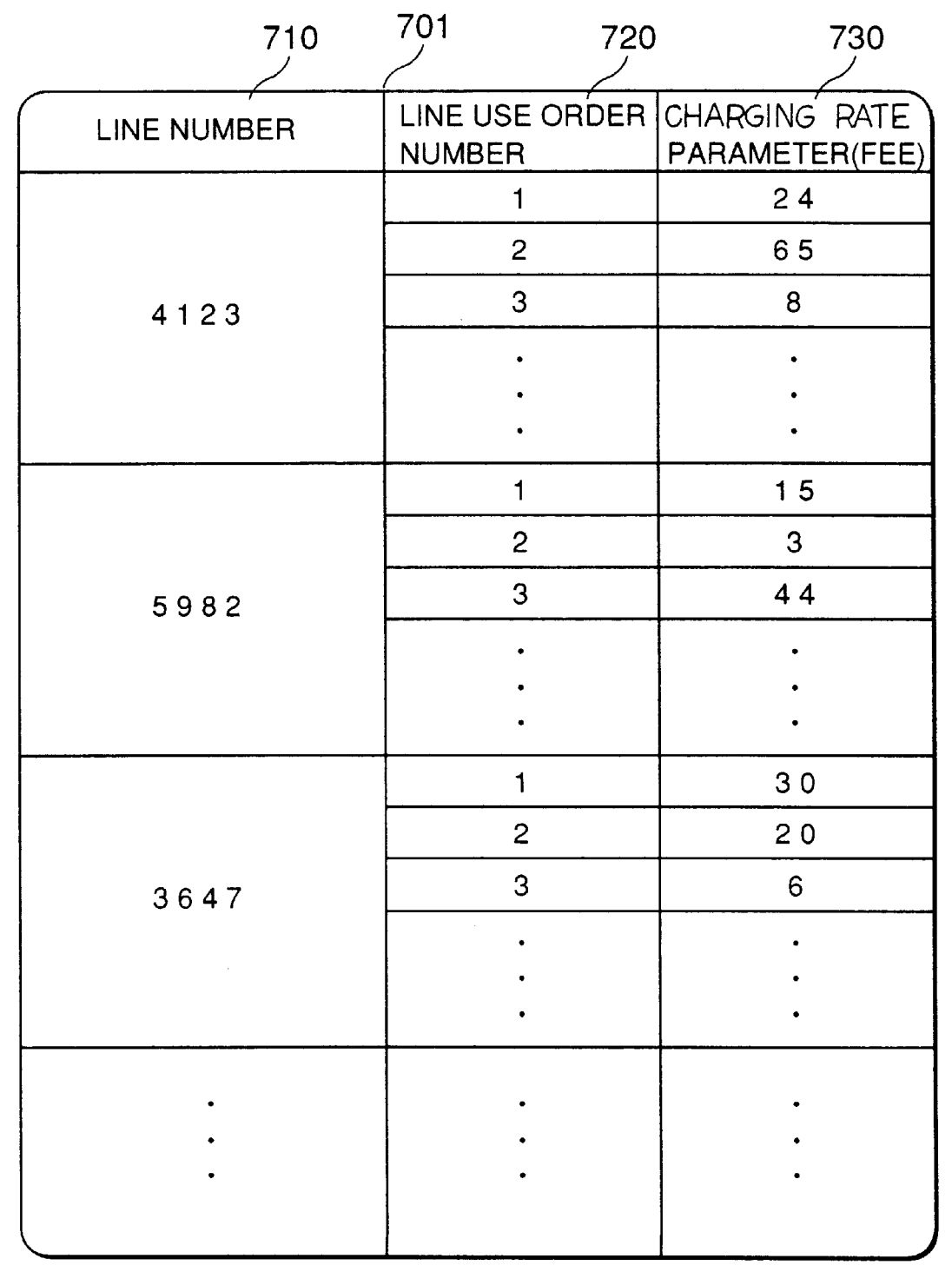

Here, as shown in FIG. 10, in the line billing information data base 701 a line use order 720 of each line (line number 710) and a charging rate parameter 730 (the fee of a telephone call using the line) for every line use order of the line are stored.

Figure 11:
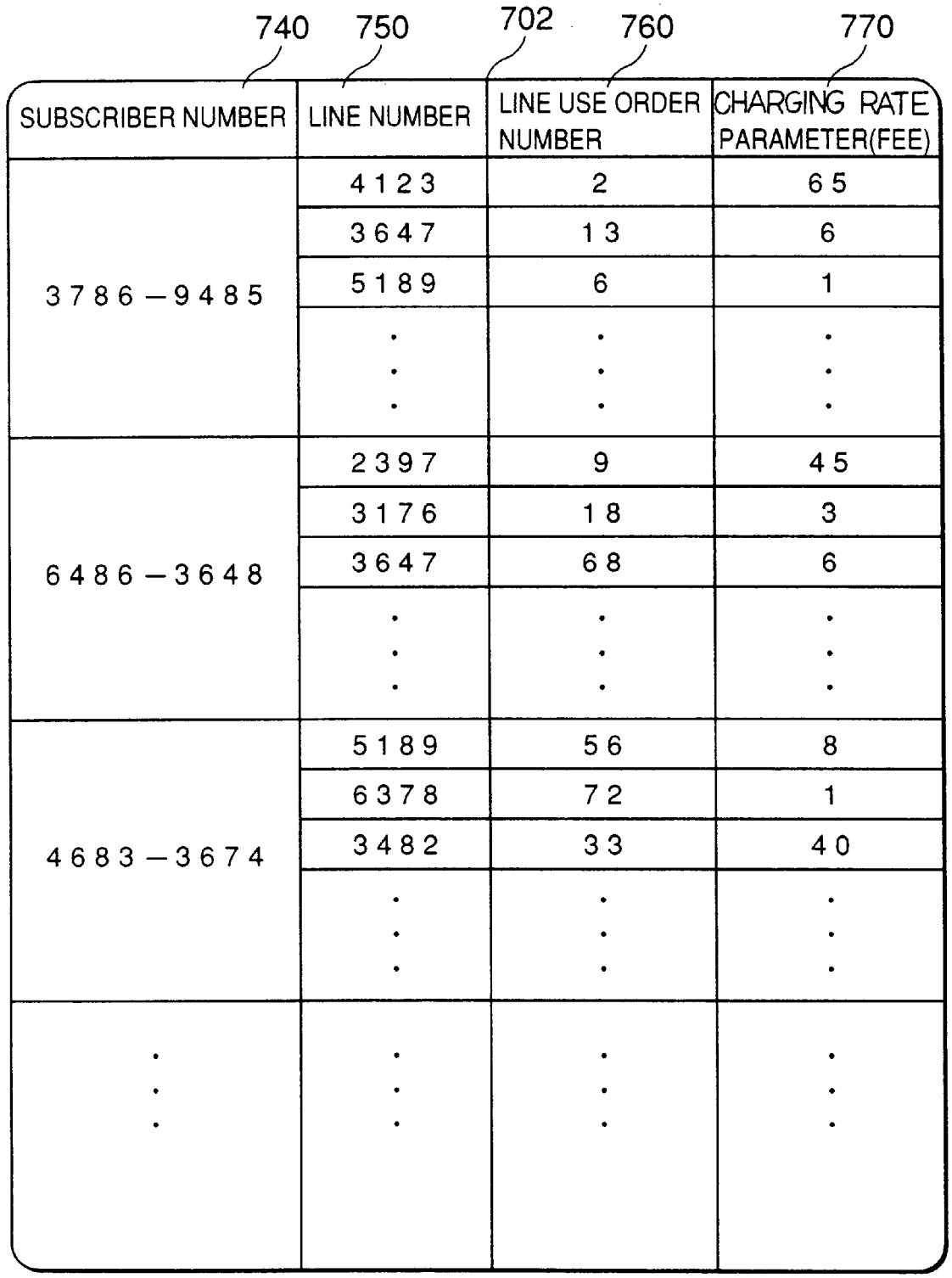
FIG. 11 is a block diagram showing the content of a subscriber billing information data base.

Further, as shown in FIG. 11, in the subscriber billing information data base 702 a PS number 740, a line number 750 of a line being used (used line number), a line use order 760, and a charging rate parameter 770 of each line when the line is used, are stored.

Next, the processing of the processor 705 which is performed according to the subscriber billing processing program 722 to prepare the subscriber billing information data base 702 as described above will be described.

Figure 12:
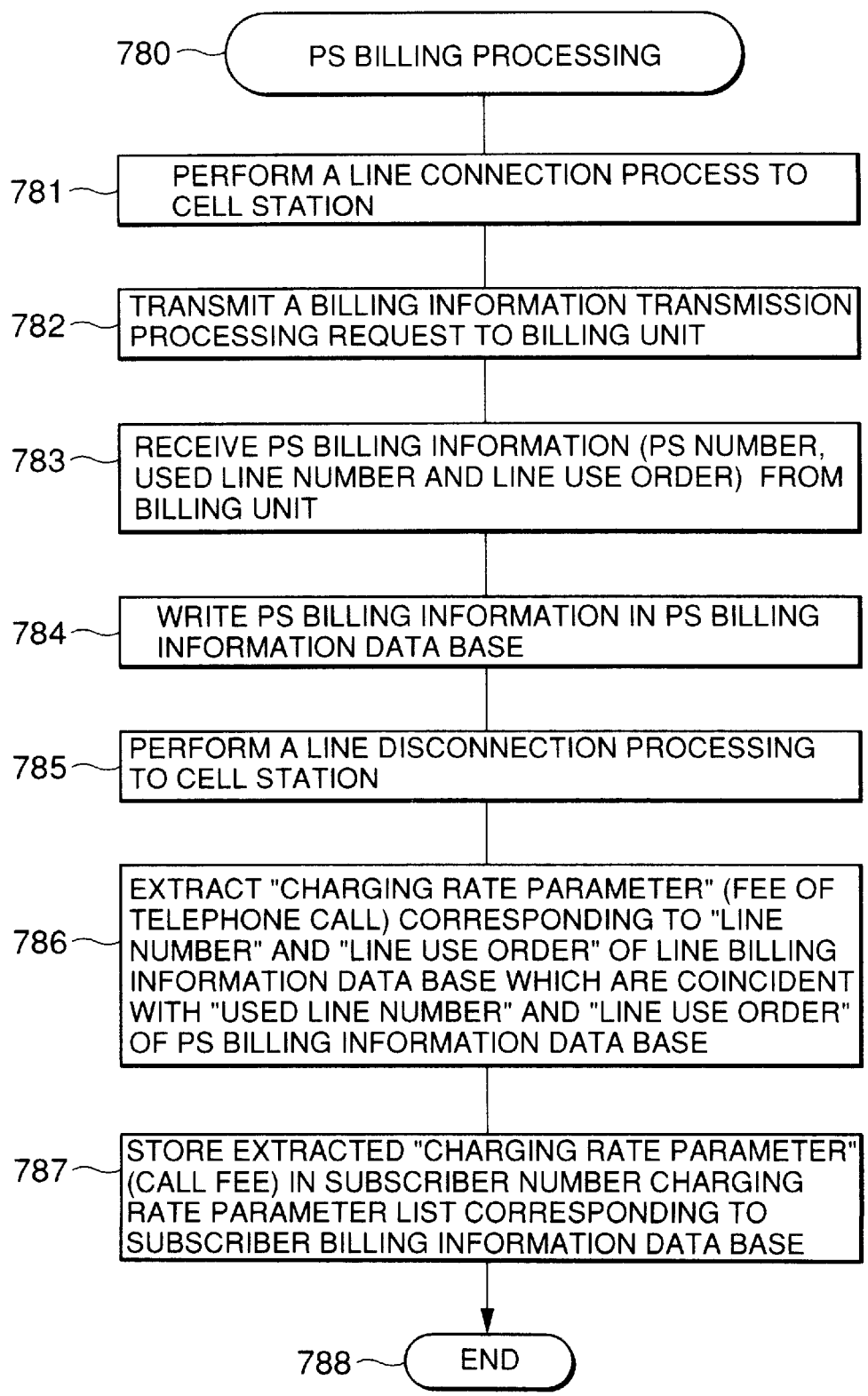
FIG. 12 is a flowchart showing a PS billing processing program.

FIG. 12 is a flowchart showing this processing.

In this processing, a call is successively made to a cell station 200 (or concentrator 300) having a billing unit 500 through the exchange unit 1200 to perform a line connection to the cell station 200 (or concentrator 300) (781). When the line is connected, the billing information transmitting request as described above is transmitted (782). If in response to the billing information transmitting request, the PS billing information is transmitted as a subscriber information response signal (subscriber information acknowledging (Ack) signal) from the cell station 200 (or concentrator 300) having the billing unit 500, the subscriber information response signal is received (783), and written into the PS billing information data base 703 (784), thereafter disconnecting the line (785).

Thereafter, the information on the PS number, the use line number and the line use order in the PS billing information data base 702 is taken out, and written as the PS number (the number of a personal station) 740, the use line number 750 and the line use order 760 of the subscriber billing information data base 710 shown in FIG. 11.

Further, for each PS number (the number of a personal station) 740 written in the subscriber billing information data base 710, an entry containing a pair of the line number 710 and the line use order 720 which are coincident with each pair of the use line number 750 and the line use order 760 which are associated with the PS number 740 in the subscriber billing information data base 710 is searched from the line billing information data base 701 to extract the charging rate parameter 730 in the searched entry (786), and the charging rate parameter thus extracted is written as the charging rate parameter 770 corresponding to the pair of the same use line 750 and the same line use order 760 of the subscriber billing information data base 710 (783), thereafter finishing the processing (784). The procedure of creating the data base of FIG. 11 from the data base shown in FIGS. 10 and 7 will be described in more detail.

Now, considering a PS number (the number of a personal station) "3786-9485", on the basis of the data base 703 created from the data base 503 of FIG. 7, it is found that the PS indicated by the number "3786-9485" is the second personal station which uses the line number 4123. Further, by referring to the data base 701, the charging rate parameter of a telephone call of the second personal station which uses the line number 4123 is specified to 65. Through the above process, the data base 702 is successively created.

Through the above processing, the subscriber billing information data base 710 shown in FIG. 11 is created. For totalization, the sum of the charging rate parameter which is associated with each PS number of the subscriber billing information data base 710 is calculated as billing information for the PS number.

Next, a communication sequence which is performed by the communication system as described above will be described.

Figure 13:
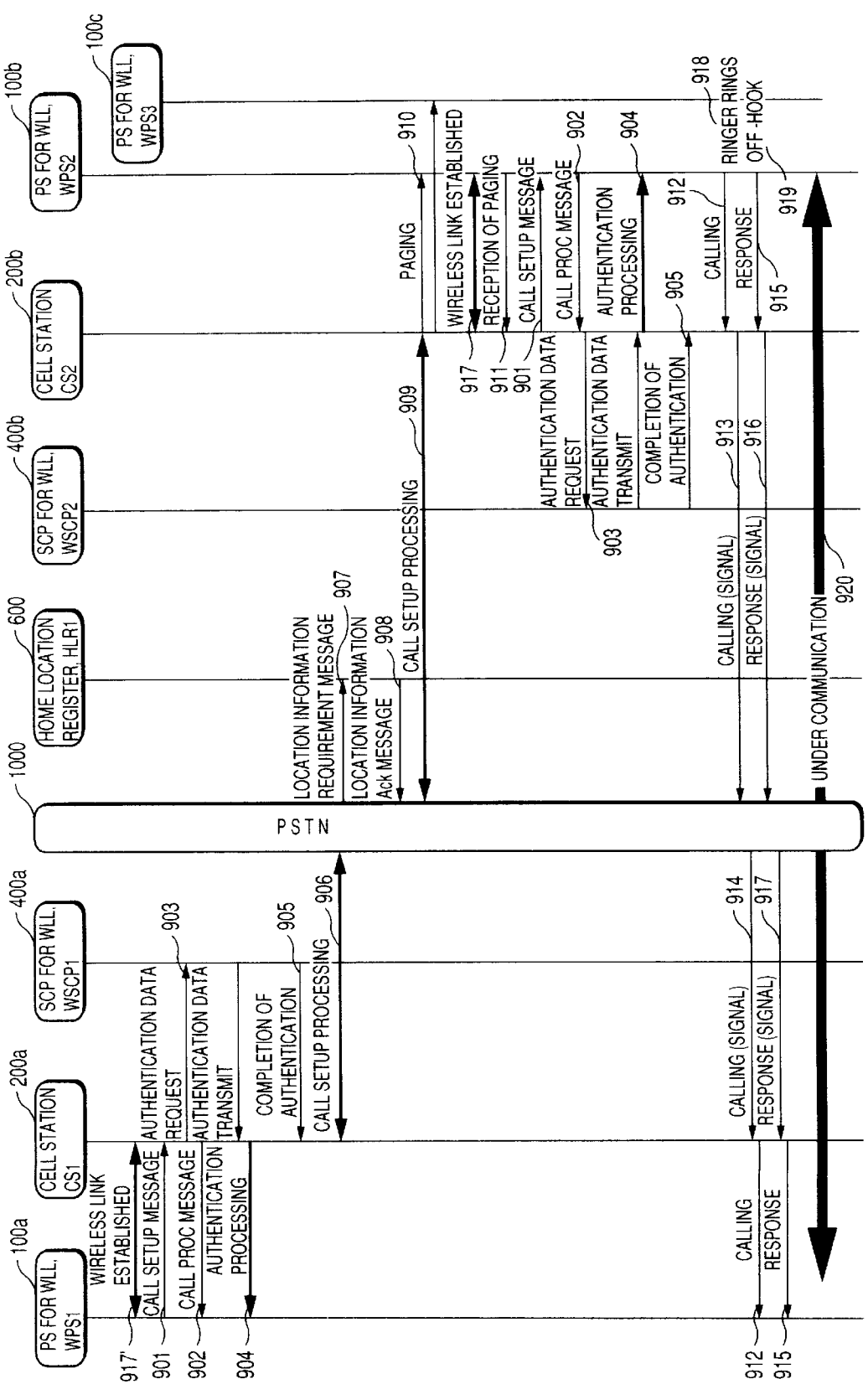
FIG. 13 is a diagram showing a communication sequence on authentication of a PS.

FIG. 13 shows a sequence when a telephone call is started from a PS 100 (100a) to another PS 100 (100b).

As shown in FIG. 13, WLL is established between WPS1 (PS 100a) and CS1 (cell station 200a) (900), a call set up message (SETUP Message) 901 is transmitted from WPS1 to CS1, and a call setup reception message (CALL PROC Message) 902 is returned from CS1 to WPS1. At the same time, CS1 transmits the authentication processing request signal 903 to WSCP1 (SCP for WLL 400a) to obtain authentication data, and performs PS authentication processing 904 of WPS1 between CS1 and WPS1. After the authentication processing 904, call setup processing 906 is performed between CS1 and PSTN 1000 (exchange unit 1200).

The exchange unit 1200 inquires of HLR1 about the location information (the routing number of a cell station in which WPS2 is accommodated or an exchange unit number in which the cell station is accommodated) of WPS2 serving as a call target with a location information requirement message 907. HLR1 returns the location information of the WPS2 with a location information Ack message 908. By referring to this location information, the exchange unit 1200 performs the call setup processing 909 on CS2 accommodating WPS2, and CS2 transmits a paging message 910 to plural PSs for WLL 100b, 100c (WSP2, WPS3) accommodated in CS2.

WPS2 establishes WLL link (900) with CS2 (cell station 200a) when it receives the paging message 910 addressed thereto, and returns a paging Ack message 911. CS2 performs the call setup processing (transmission/reception of the calling setup message (SETUP Message) 901, the call setup reception message (CALL PROC Message) 902), transmits the authentication data request 903 of WPS2 to WSCP2 to obtain authentication data, and performs the authentication processing. After the authentication processing is finished, WPS2 transmits the paging message 912 addressed to WPS1 simultaneously with the ringing of a ringer 918, and transmits a response message (acknowledging (Ack) message) 915 addressed to WPS1 simultaneously with off-hook 919. CS2 relays these paging message 912 and the response message 915.

After this message is received by WPS1, a communication line is set up between WPS1 and WPS2 to allow communication (telephone call).

Figure 14:
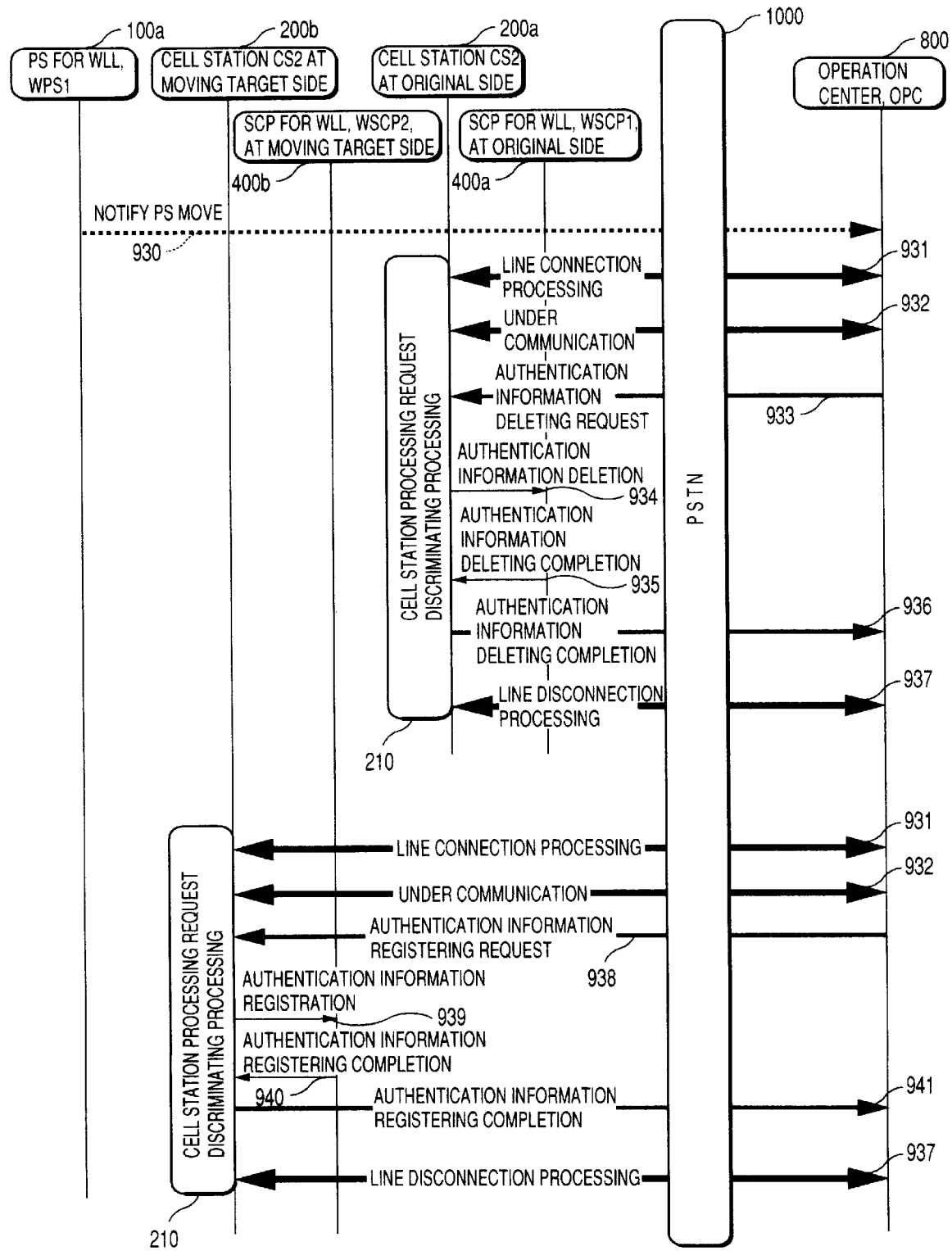
FIG. 14 is a diagram showing a communication sequence on a shift processing of authentication data due to the movement of a PS.

FIG. 14 shows a sequence when the PS 100 (100a) is moved to an area under the control of another cell station 200 (200b) due to house-moving of a subscriber or the like and thus the authentication data of the PS is also moved to SCP 400 (400b) of the cell station 200 (200b).

In this sequence, first, the subscriber informs the OPC 800 of a place to which WPS1 (PS for WLL 100a) moves (930). The OPC 800 performs the line connection processing (931) on CS1 where WPS1 has been accommodated until now (i.e., the cell station 200a at the original side from which WPS1 moves). By detecting a call addressed thereto from the OPC 800, CS1 starts the cell station processing request discriminating processing 210. After the OPC-CS1 line connection is established, the authentication information deleting request 933 for requesting deletion of authentication information of WPS1 is transmitted from OPC 800 to CS2, and CS2 transmits an authentication information deleting signal 934 to WSCP1 (SCP for WLL 400a at the original side from which WPS1 moves) which holds the authentication information of WPS1. While deleting of the authentication information of WPS1 in WSCP1, CS2 returns the authentication information deletion completion 935 containing the same authentication information to CS1. CS1 returns the same authentication information deletion completion 936 to OPC 800. Thereafter, the line disconnection processing 937 of OPC-CS1 is performed.

Subsequently, OPC 800 performs the line connection 931 to CS2 (cell station 200b at a target side to which WSP1 moves) in which the moved WPS1 is accommodated, and transmits to CS2 the authentication information registering request 938 containing the authentication information (PS number or authentication data) of WPS1. CS2 transmits an authentication information registering signal 939 to WSCP2 (SCP for WLL 400b at the target side) which will hold the authentication information of WPS1 after being moved. After performing the authentication information registering processing of WPS1, WSCP2 returns an authentication information registering completion message 940 to CS2. CS2 transmits the authentication information registering completion message to the OPC 800, and the movement of the authentication information of WPS1 is completed.

Figure 15:
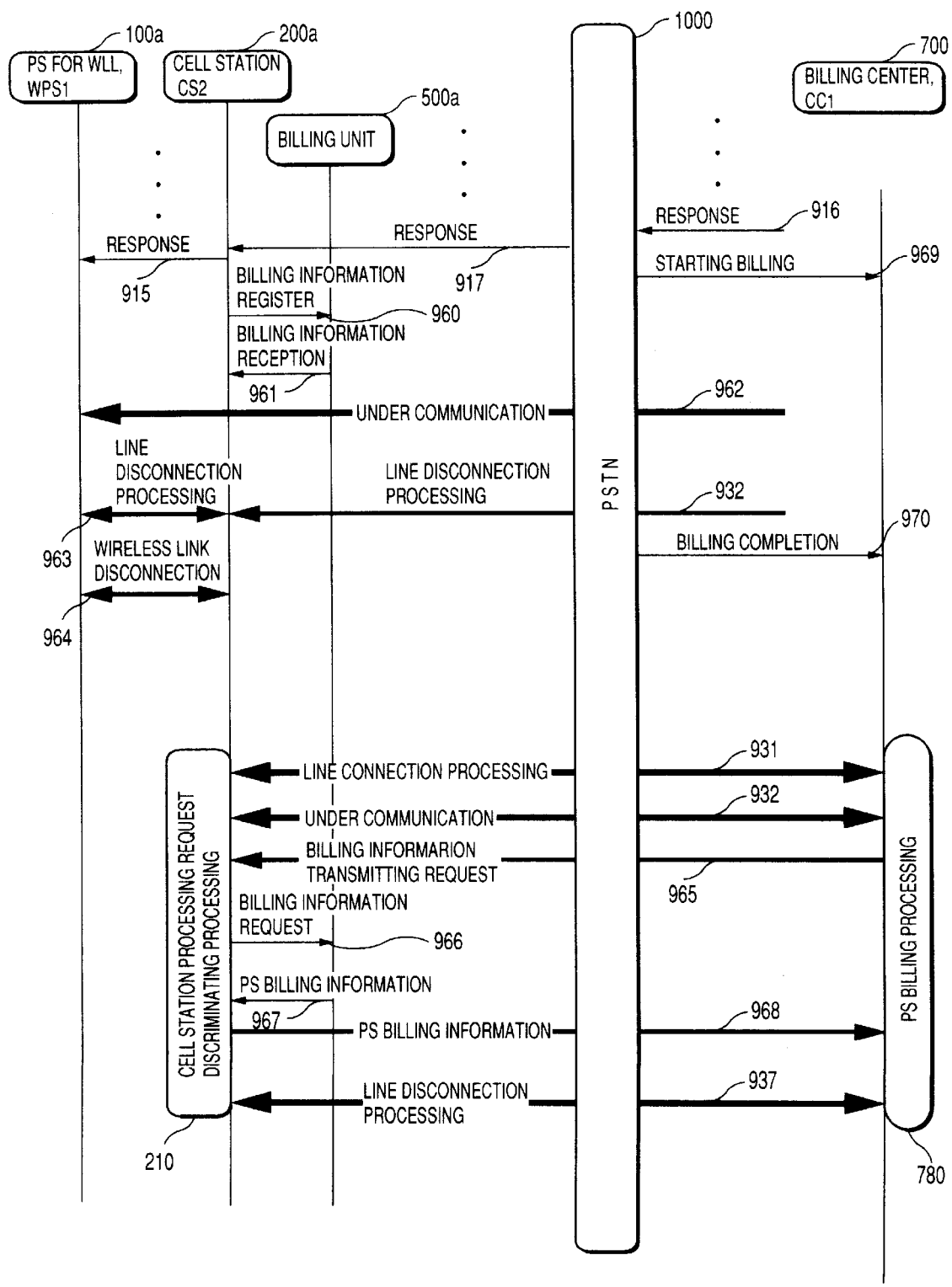
FIG. 15 is a diagram showing a communication sequence on billing.

FIG. 15 shows a sequence for billing when the PS (100a) is a calling PS and the calling side billing system is adopted.

The exchange unit 1200 in PSTN 1000 which accommodates CS1 (the cell station 200a in which the PS for WLL at the calling side is accommodated) notifies a billing start 969 to CC1 (billing system 700) after receiving a response (acknowledgement) 916 of a paged (called) PS to a call of WPS 100a, and CC1 performs the billing processing of a line which is used by CS1. Specifically, the line number and the line use order of the line are first registered in the line billing information data base 701. After the line disconnection processing after the end of a telephone call is performed, the exchange unit 1200 notifies the end of the billing and the charging rate parameter to CC1. Upon receiving these data, CC1 registers the charging rate parameter on the basis of the entry of the line number and the line use order which are first registered in the line billing information data base 701, and finishes the billing processing.

Further, after receiving the response (acknowledgment) 970 from the paged PS, CS1 transmits a billing information registering signal 960 to CU1 (billing unit 500a) connected to CS1, and then CU1 which receives the billing information registering signal 960 returns a billing information receiving response (acknowledgment) 961 to CS1 to register the PS billing information. As described above, the line number 520, the PS number 510 of WPS1 and the line use order which are used for the line connection of CS1-PSTN 1000, are transmitted to CU1 together with the billing information registering signal 960.

The billing center (CC1) performs the line connection 931 to each cell station CS1 having the billing unit 500 periodically or in accordance with an instruction of an operator to transmit the billing information transmitting request 965 by using the line. CS1 transfers the billing information request signal 966 to CU1, and CU1 transmits PS billing information 967 to WPS1. CS1 transmits the PS billing information to CC1 and disconnects the line of CS1-CC1 (937). CC1 collates the received PS billing information or the PS billing information data base 703 created from the received PS billing information with the line billing information data base 701 which is held by CC1 to determine the billing charging rate parameter of each WPS1, and creates and holds a subscriber billing information data base 702.

In the embodiment as described above, the PS number, the line number and the line order are registered for every telephone call in the billing unit 500, the line number, the line use order and the charging rate parameter are registered for every telephone call in the billing center 700, and the PS number and the charging rate parameter are associated with each other by using the line number and the line use order as a key. However, other information may be used as a key for associating the PS number information and the charging rate parameter. For example, a time for which the line is used may be registered in place of the line use order to associate the PS number and the charging rate parameter by using the line number and the line use time as a key. In this case, the same billing can be achieved even when it is associated with the PS number or the line number to record a telephone start time (further a telephone end time).

Further, in the embodiment as described above, all the billing information of the held data base 503 is transmitted at the same time from the billing unit 500 to the billing center 700 in response to the request from the billing center 700. However, it may be adopted that the billing center 700 requests only the transmission of the billing information of the PS number of a personal station to which the billing charging rate parameter is required, the billing unit 500 transmits only the billing information of the required PS number to the billing center 700, and the charging rate parameter corresponding to the PS number is determined in the billing center 700.

Still further, in the embodiment as described above, the billing unit and the SCP for WLL are provided as devices which are separate from the cell station and the concentrator. However, the cell station and the concentrator may be designed so as to contain the function of the billing unit or SCP for WLL.

Still further, the current value of the line use order used in the billing unit 500 is reset to zero at the time when all the billing information is transmitted to the billing center 700. However the current value of the line use order used in the billing center 700 may be reset to zero at the time when the charging rate parameter of each PS number is determined in the billing center 700.

As described above, according to the present invention, there can be provided a communication system of the personal stations in which accurate billing to a subscriber or authentication of a subscriber PS can be performed even when an existing analog subscriber line is used between a cell station and a network or between a concentrator and a network.

What is claimed is:

1. A communication system including an exchange unit for calculating a fee of a telephone call on a line basis, cell stations which are connected to said exchange unit through lines, and plural personal stations which are connected to each of said cell stations through wireless lines, wherein the number of lines is smaller than the number of said personal stations;

each of said cell stations is provided with storage means for storing, as personal station use information, a personal station which is connected to said cell station and uses a line for a telephone cell and a line use time of said personal station every time said personal station makes the telephone cell through said cell station and said line; and said exchange unit is provided with storage means for storing a line use time and the fee of a telephone call as line use information every time a line connected to said exchange unit is used, and a billing system connected to said exchange unit is provided with calculation means for calculating the fee of a telephone call of a personal station for which the line use time is coincident between the personal station use information and the line use information.

2. A communication system containing plural personal stations, cell stations each of which accommodates personal stations through wireless lines, a subscriber line exchange network which accommodates said cell stations through plural analog subscriber lines, and a billing system device connected to said subscriber line exchange network, wherein each of said cell stations is provided with means for generating and recording local information which comprises personal station discrimination information for identifying a personal station making a telephone call, line discrimination information for specifying an analog subscriber line used for the telephone call and call discrimination information for identifying every telephone call which is made through said cell station and said subscriber line exchange network by a personal station connected to said cell station and for which said personal station is billed; and means for transmitting the recorded local information through said subscriber line exchange network to said billing system device in response to a query which is received from said billing system device through said subscriber line exchange network; and said billing system device is provided with means for generating and recording center information which comprises line discrimination information for identifying an analog subscriber line used for a telephone call, call discrimination information for identifying the telephone call and charging rate parameter information for specifying the charging rate parameter representing the degree of usage of said subscriber line exchange network for every telephone call which is made through said cell station with said subscriber line exchange network by a personal station and for which said personal station is billed; means for transmitting said query through said subscriber line exchange network;

and means for collating the collected local information and the recorded center information with each other and generating billing information for associating the personal station discrimination information with information on the charging rate parameter of the telephone call which is made by a personal station identified by the personal station discrimination information and for which said personal station is billed.

3. A communication system including plural personal stations, plural cell stations which accommodate personal stations through wireless lines, node devices each of which accommodate cell stations through digital lines, a subscriber line exchange network which accommodates said node devices through analog subscriber lines, and a billing system device connected to said subscriber line exchange network, wherein each of said node devices is provided with means for generating and recording location information which comprises personal station discrimination information for identifying a personal station which makes a telephone call, line discrimination information for identifying an analog subscriber line used for the telephone call and call discrimination information for identifying every telephone call which is made through said node device with said subscriber line exchange network by a personal station connected to a cell station accommodated in said node device and for which said personal station is billed; and means for transmitting the recorded local information through said subscriber line exchange network to said billing system device in response to a query which is received from said billing system device through said subscriber line exchange network; and said billing system device is provided with means for generating and recording center information which comprises line discrimination information for identifying an analog subscriber line used for a telephone call, call discrimination information for identifying the telephone call and charging rate parameter information for specifying a charging rate parameter representing the degree of usage of said subscriber line exchange network in the telephone call, every telephone call which is made through said node device with said subscriber line exchange network by said personal station and for which said personal station is billed; and means for transmitting said query through said subscriber line exchange network, and means for collating the collected local information and the recorded center information with each other and generating billing information for associating the personal station discrimination information with information on the charging rate parameter of the telephone call which is made by a personal station identified by the personal station discrimination information and for which said personal station is billed.

4. The communication system as claimed in claim 3, wherein said node device is a concentrator for accommodating plural cell stations through digital lines.

5. A call station which accommodates personal stations through wireless lines and is connected to a subscriber line exchange network through an analog subscriber line, comprising:

means for generating and recording local information which comprises personal station discrimination information for identifying a personal station making a telephone call, line discrimination information for identifying an analog subscriber line used for the telephone call and call discrimination information for identifying every telephone call which is made through said cell station with said subscriber line exchange network by said personal station connected to said cell station and for which said personal station is billed; and means for transmitting the recorded local information from said cell station through said subscriber line exchange network in response to a predetermined query which is received through said subscriber line exchange network from said cell station.

6. A node device which accommodates cell stations, each cell station accommodating personal stations through wireless lines, and is connected to a subscriber line exchange network through an analog subscriber line, comprising:

means for generating and recording local information which comprises personal station discrimination information for specifying a personal station which makes a telephone call, line discrimination information for identifying an analog subscriber line used for the telephone call and call discrimination information for identifying every telephone call which is made through said node device with said subscriber line exchange network by a personal station connected to a cell station accommodated in said node device and for which said personal station is billed; and means for transmitting the recorded local information from said node device through said subscriber line exchange network in response to a query which is received from said billing system device through said subscriber line exchange network.

7. A billing system device which is connected to a subscriber line exchange network for exchanging a call of a personal station device to an analog subscriber line, comprising:

means for generating and recording center information which comprises line discrimination information for identifying an analog subscriber line used for the telephone call, call discrimination information for the telephone call and charging rate parameter information for specifying the charging rate parameter representing a degree of usage of said subscriber line exchange network during every telephone call which is made with said subscriber line exchange network by a personal station and for which said personal station is billed;

means for collecting local information comprising personal station discrimination information for a personal station making a telephone call, line discrimination information for an analog subscriber line used for the telephone call and call discrimination information for identifying the telephone call through said subscriber line exchange network from a relay device connected to said subscriber line exchange network through the analog subscriber line, for every telephone call which is made with said subscriber line exchange network by a personal station and for which said personal station is billed; and means for collating the collected local information and the recorded center information with each other to generate billing information for associating the personal station discrimination information with information of the charging rate parameter of the telephone call for which said personal station is billed.

8. The communication system as claimed in claim 2, wherein the call discrimination information contained in the local information and the center information represents information of the use order of an analog line used by a telephone call which is identified by the call discrimination information.

9. The communication system as claimed in claim 3 wherein the call discrimination information contained in the local information and the center information represents information of the use order of an analog line used by a telephone call which is identified by the call discrimination information.

10. The communication system as claimed in claim 4, wherein the call discrimination information contained in the local information and the center information represents information of the use order of an analog line used by a telephone call which is identified by the call discrimination information.

* * * * *